Figure 1:
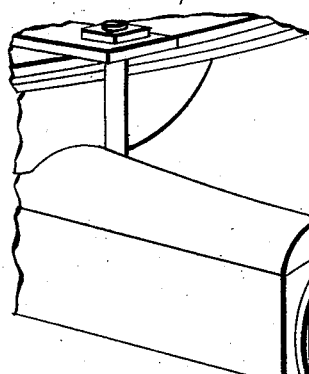

(No Model.)

G. SIEGENTHALER.
NUT LOCK.

No. 522,679. Patented July 10, 1894.

Witnesses
Severance
H. Lauck

Inventor
George Siegenthaler
by J. J. Johnson
his Attorney

UNITED STATES PATENT OFFICE.

GEORGE SIEGENTHALER, OF FREMONT, OHIO.

NUT-LOCK.

SPECIFICATION forming part of Letters Patent No. 522,679, dated July 10, 1894.

Application filed January 26, 1894. Serial No. 498,087. (No model.)

*To all whom it may concern:*

Be it known that I, GEORGE SIEGENTHALER, a citizen of the United States, residing at Fremont, in the county of Sandusky and State of Ohio, have invented certain new and useful Improvements in Taps or Nuts for Carriage-Spindles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in nuts or taps for spindles for wagons, carriages, &c., and is designed for the purpose of preventing the nut or tap from being run off, or becoming loose, or accidentally removed, and is so constructed as to provide a safe and reliable lock for this purpose.

The invention consists of a nut or tap provided on one side thereof with a suitable opening, and angular or curved locking arms secured on each side of the said opening and having their forward ends passing into and through the said opening and biting in and between the threads on the end of the spindle, and provided with spring ends for holding the said arms in contact with the bolt.

The invention further consists in the novel construction and arrangement of the several parts hereinafter described, illustrated in the drawings, and more particularly pointed out in the claim hereunto appended.

Figure 2:
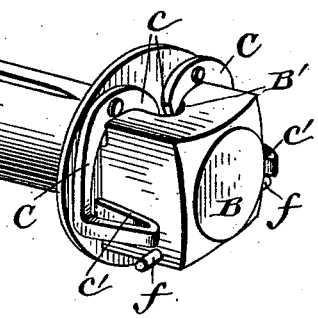
Figure 3:
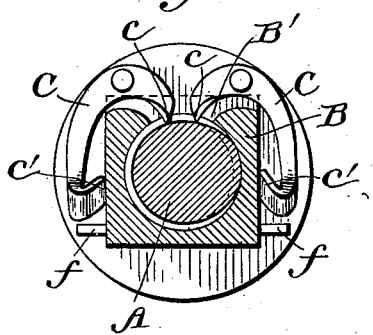

In the drawings, Figure 1 is a view showing my improved nut or tap secured upon a spindle. Fig. 2 is a sectional view of the tap and spindle, the locking mechanism being shown in elevation. Fig. 3 is a sectional view of the device.

Similar letters of reference indicate corresponding parts in all the figures.

In the drawings A represents the spindle of a carriage or wagon, and B the nut or tap therefor. This nut or tap B is about of the same general form as that now in general use for spindles, but has on one side a slot or opening B' into and through which project the ends of the locking mechanism, as shown. On the circular portion of the nut or tap B are two angular or circular arms C, one pivoted at each side of the slot or opening B', in such manner that the locking ends will project into and through the said opening and impinge against and bite the threads on the end of the spindle. It is to be observed that the locking points $c$ on the ends of the locking arm C rest between the threads upon the spindle and bite upon the threads on each side, and that these points are just broad enough to fit snugly in between, and bind upon the said threads. The other ends of these locking arms are curved around the nut or tap and bent upward and returned, the free ends thereof resting against the sides of the nut, as shown, forming spring ends which serve the purpose of continually holding the ends of the locking arms C in contact with the end of the spindle when in their normal position.

$f, f$, are stops on the nut or tap upon which a portion of the wrench rests or fits, and are for the purpose of protecting the spring ends $c', c'$.

It will be further observed that the bent spring ends $c'$, of the locking arms C are so shaped and constructed and placed upon the nut that they do not interfere in any way with its adjustment or removal.

It is to be further noted that by this construction of a tap or nut for wagons and carriages that I can screw the nut upon the threaded end of the spindle to any position between the end of the spindle and the journal portion thereof, and it will be as securely locked as if the tap had been screwed up tight against the journal portion of the spindle, as is apparent. This is a great advantage as by this means the wheel can always be kept tight, thus preventing rattling, sagging and swaying and the consequent cutting of the spindle.

It should be further noted that in the use of a nut of this character, the necessity for the use of washers may be wholly done away with as the nut can, at all times, be held positively against the outer bearing surface of the wheel.

Another great advantage of this improved nut or tap is that when it is locked upon the end of the spindle it cannot be removed without the use of a wrench, and as a result cannot be run off or accidentally displaced.

It is to be further noted that by the use of the double locking mechanism the tap when at any position between the outer end of the spindle and the inner end of the threaded portion thereof cannot be turned in either direction, as it is locked positively and absolutely in that one position. It is a well known fact that when washers are used on the spindle, either at the front or back of the wheel that a nut or tap cannot be secured on the spindle, so that there is no danger of it working off, as the tendency of a washer is at all times to push outward and thereby exert a pressure on the nut or tap which eventually causes it to run off, as it is never locked in the inner ends of the threads.

My improved tap can be locked at any point on the threaded end of the spindle as securely as if it were screwed home tightly up to the ends of the threads.

Having described my invention, what I claim is—

In a lock for spindle nuts the combination with a nut having a polygonal outer portion, and the annular flanged rim portion, the main polygonal portion having an opening therein at one side, of the locking arms pivoted upon the flanged portion, said arms having teeth at one end to pass through the opening in the nut and engage the threaded spindle, the said arms being curved around the sides of the polygonal portion and then bent to bear against the sides of the polygonal portion, and the stops on the sides of the said portion, substantially as and for the purpose set forth.

In testimony whereof I affix my signature in presence of two witnesses.

GEORGE SIEGENTHALER.

Witnesses:
 E. D. BEMIS,
 MAGGIE KEEFE.